US011719805B2

(12) United States Patent
Santra et al.

(10) Patent No.: US 11,719,805 B2
(45) Date of Patent: Aug. 8, 2023

(54) RADAR BASED TRACKER USING EMPIRICAL MODE DECOMPOSITION (EMD) AND INVARIANT FEATURE TRANSFORM (IFT)

(71) Applicant: Infineon Technologies AG, Neubiberg (DE)

(72) Inventors: Avik Santra, Munich (DE); Prachi Vaishnav, Munich (DE)

(73) Assignee: Infineon Technologies AG, Neubiberg (DE)

( * ) Notice: Subject to any disclaimer, the term of this patent is extended or adjusted under 35 U.S.C. 154(b) by 338 days.

(21) Appl. No.: 16/951,432

(22) Filed: Nov. 18, 2020

(65) Prior Publication Data

US 2022/0155434 A1    May 19, 2022

(51) Int. Cl.
*G01S 13/72*    (2006.01)
*G01S 7/41*    (2006.01)
*G01S 13/58*    (2006.01)

(52) U.S. Cl.
CPC .............. *G01S 13/726* (2013.01); *G01S 7/411* (2013.01); *G01S 7/415* (2013.01); *G01S 7/417* (2013.01); *G01S 13/584* (2013.01)

(58) Field of Classification Search
CPC ........ G01S 13/726; G01S 7/411; G01S 7/415; G01S 7/417; G01S 13/584; G01S 7/2883; G01S 7/418; G01S 13/282; G01S 13/44; G01S 13/582; G01S 13/878; G01S 13/66
See application file for complete search history.

(56) References Cited

U.S. PATENT DOCUMENTS

| | | | |
|---|---|---|---|
| 4,241,347 | A | 12/1980 | Albanese et al. |
| 6,147,572 | A | 11/2000 | Kaminski et al. |
| 6,414,631 | B1 | 7/2002 | Fujimoto |
| 6,636,174 | B2 | 10/2003 | Arikan et al. |
| 7,048,973 | B2 | 5/2006 | Sakamoto et al. |
| 7,057,564 | B2 | 6/2006 | Tsai et al. |
| 7,171,052 | B2 | 1/2007 | Park |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Zhang, et al, "EMD Interval Thresholding Denoising Based on Correlation Coefficient to Select Relevant Modes"; Proceedings of the 34th Chinese Control Conference; Jul. 2015; Hangzhou, China (Year: 2015).*

(Continued)

*Primary Examiner* — Donald H B Braswell
(74) *Attorney, Agent, or Firm* — Slater Matsil, LLP

(57) ABSTRACT

In an embodiment, a method for tracking targets includes: receiving data from a radar sensor of a radar; processing the received data to detect targets; identifying a first geometric feature of a first detected target at a first time step, the first detected target being associated to a first track; identifying a second geometric feature of a second detected target at a second time step; determining an error value based on the first and second geometric features; and associating the second detected target to the first track based on the error value.

21 Claims, 7 Drawing Sheets

(56) References Cited

U.S. PATENT DOCUMENTS

| | | |
|---|---|---|
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,229,102 B1* | 1/2016 | Wright ................. G01S 13/885 |
| 9,413,079 B2 | 8/2016 | Kamgaing et al. |
| 9,495,600 B2 | 11/2016 | Heu et al. |
| 9,664,779 B2 | 5/2017 | Stainvas Olshansky et al. |
| 9,886,095 B2 | 2/2018 | Pothier |
| 9,935,065 B1 | 4/2018 | Baheti et al. |
| 10,795,012 B2 | 10/2020 | Santra et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0152600 A1* | 6/2010 | Droitcour ............. A61B 5/1113 |
| | | 600/534 |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2018/0232947 A1* | 8/2018 | Nehmadi ................ G01S 7/295 |
| 2018/0275265 A1 | 9/2018 | Bilik et al. |
| 2019/0317191 A1 | 10/2019 | Santra et al. |
| 2020/0126249 A1* | 4/2020 | Tang ..................... G06T 7/579 |
| 2021/0208247 A1* | 7/2021 | John Wilson ......... G01S 13/931 |
| 2021/0255307 A1* | 8/2021 | Bongio Karman ... G01S 13/582 |
| 2022/0076432 A1* | 3/2022 | Ramezani ............ G06N 3/0445 |
| 2022/0161782 A1* | 5/2022 | Laine .................... B60W 30/04 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |

(56) References Cited

FOREIGN PATENT DOCUMENTS

| WO | 2013009473 A2 | 1/2013 |
|---|---|---|
| WO | 2016033361 A1 | 3/2016 |

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, CSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gigie, Andrew et al., "Novel Approach for Vibration Detection Using Indented Radar", Progess in Electromagnetic Research C, vol. 87, pp. 147-162, Oct. 4, 2018.

Gouveia, Carolina et al., "A Review on Methods for Random Motion Detection and Compensation in Bio-Radar Systems", Sensors, MDPI, Jan. 31, 2019, 17 pages.

Gu, Changzhan et al., "Assessment of Human Respiration Patterns via Noncontact Sensing Using Doppler MultiRadar System", Sensors Mar. 2015, 15(3), 6383-6398, doi: 10.3390/s150306383, 17 pages.

Gu, Changzhan et al., "Deep Neural Network based Body Movement Cancellation for Doppler Radar Vital Sign Detection", IEEE MTT-S International Wireless Symposium (IWS) May 19-22, 2019, 3 pages.

Gu, Changzhu "Short-Range Noncontact Sensors for Healthcare and Other Emerginng Applications: A Review", Sensors, MDPI, Jul. 26, 2016, 24 pages.

Gu, Changzhan et al., "From Tumor Targeting to Speed Monitoring", IEEE Microwave Magazine, ResearchGate, Jun. 2014, 11 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.

Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWRIxxx Power Management Optimizations—Low Cost LC Filter Solution," Application Report SWRA577, Texas Instruments, Oct. 2017, 19 pages.

Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.

Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.

Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.

Li, Changzhi "Vital-sign monitoring on the go", Sensors news and views, www.nature.com/naturelectronics, Nature Electronics, vol. 2, Jun. 2019, 2 pages.

Lim, Soo-Chui et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.

Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Mostov, K., et al., "Medical applications of shortwave FM radar: Remote monitoring of cardiac and respiratory motion", Am. Assoc. Phys. Med., 37(3), Mar. 2010, pp. 1332-1338.

(56) References Cited

OTHER PUBLICATIONS

Oguntala, G et al., "Indoor location identification technologies for real-time IoT-based applications: an inclusive survey", Elsevier Inc., http://hdl.handle.net/10454/16634, Oct. 2018, 42 pages.

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing," McGraw Hill Electronic Engineering, ISBN: 0-07-144474-2, Jun. 2005, 93 pages.

Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.

Santra, Avik et al., "Short-range multi-mode continuous-wave radar for vital sign measurement and imaging", ResearchGate, Conference Paper, Apr. 2018, 6 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

Chadha, H. et al., "The Unscented Kalman Filter: Anything EKF can do I can do it better!," https://towardsdatascience.com/the-unscented-kalman-filter-anything-ekf-can-do-i-can-do-it-better-ce7c773cf88d, Apr. 27, 2018, 14 pages.

Soumekh, M., "SAR-ECCM Using Phase-Perturbed LFM Chirp Signals and DRFM Repeat Jammer Penalization," IEEE, Jun. 6, 2005, 6 pages.

Zhang, H. et al., "EMD-based Gray Association Algorithm for Group Ballistic Target," The 2019 6th International Conference on Systems and Informatics (ICSAI 2019), IEEE, Feb. 27, 2020, 6 pages.

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.

Wang, Fu-Kang et al., "Wrist Pulse Rate Monitor Using Self-Injection-Locked Radar Technology", Biosensors, MDPI, Oct. 26, 2016, 12 pages.

Wikipedia, "Scale-invariant feature transform", https://en.wikipedia.org/wiki/Scale-invariant_feature_transform, 18 pages, printed Oct. 20, 2020.

Wikipedia, "Earth mover's distance", https://en.wikipedia.org/wiki/Earth_mover%27s_distance#:~:text=In statistics%2C the earth mover's, known as the Wasserstein metric, printed Oct. 20, 2020, 5 pages.

Wikipedia, "Hilbert-Huang transform", https://en.wikipedia.org/wiki/Hilber, Huang_transform, printed Oct. 20, 2020, 11 pages.

Wikipedia, "K-means clustering", https://en.wikipedia.org/wiki/K-means_clustering, printed Oct. 20, 2020, 16 pages.

Wikipedia, "Kalman Filter", https://en.wikipedia.org/wiki/Kalman_filter#Unscented_Kalman_filter, printed Oct. 20, 2020, 35 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Will, Christoph et al., "Advanced Template Matching Algorithm for Instantaneous Heartbeat Detection using Continuous Wave Radar Systems", ResearchGate, May 2017, 5 pages.

Will, Christoph et al., "Human Target Detection, Tracking, and Classification Using 24-GHz FMCW Radar", IEEE Sensors Journal, vol. 19, No. 17, Sep. 1, 2019, pp. 7283-7299.

Will, Christoph et al., "Local Pulse Wave Detection using Continuous Wave Radar Systems", IEEE Journal of Electromagnetics, RF and Microwaves in Medicine and Biology, Oct. 25, 2017, 9 pages.

Will, Christoph et al., "Radar-Based Heart Sound Detection", Scientific Reports, www.nature.com/scientificreports, Jul. 26, 2018, 15 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

* cited by examiner

RADAR BASED TRACKER USING EMPIRICAL MODE DECOMPOSITION (EMD) AND INVARIANT FEATURE TRANSFORM (IFT)

TECHNICAL FIELD

The present disclosure relates generally to an electronic system and method, and, in particular embodiments, to a radar-based tracker for target sensing.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a method for tracking targets includes: receiving data from a radar sensor of a radar; processing the received data to detect targets; identifying a first geometric feature of a first detected target at a first time step, the first detected target being associated to a first track; identifying a second geometric feature of a second detected target at a second time step; determining an error value based on the first and second geometric features; and associating the second detected target to the first track based on the error value.

In accordance with an embodiment, a radar system includes: a millimeter-wave radar sensor including: a transmitting antenna configured to transmit radar signals; first and second receiving antennas configured to receive reflected radar signals; an analog-to-digital converter (ADC) configured to generate, at an output of the ADC, raw digital data based on the reflected radar signals; and a processing system configured to process the raw digital data to: detect targets, identify a first geometric feature of a first detected target at a first time step, identify a second geometric feature of a second detected target at a second time step, determine an error value based on the first and second features, and associate the second detected target to a first track associated to the first detected target based on the error value.

In accordance with an embodiment, a method includes: receiving data from a radar sensor of a radar; processing the received data to detect humans; clustering detected humans into clusters of cells using k-mean clustering to generate a plurality of clusters; identifying a first geometric feature of a first cluster of the plurality of clusters at a first time step; identifying a second geometric feature of a second cluster of the plurality of clusters at a second time step, where the first and second time steps are consecutive time steps; determining an error value based on the first and second features; and associating the second cluster to a first track associated to the first cluster based on the error value.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
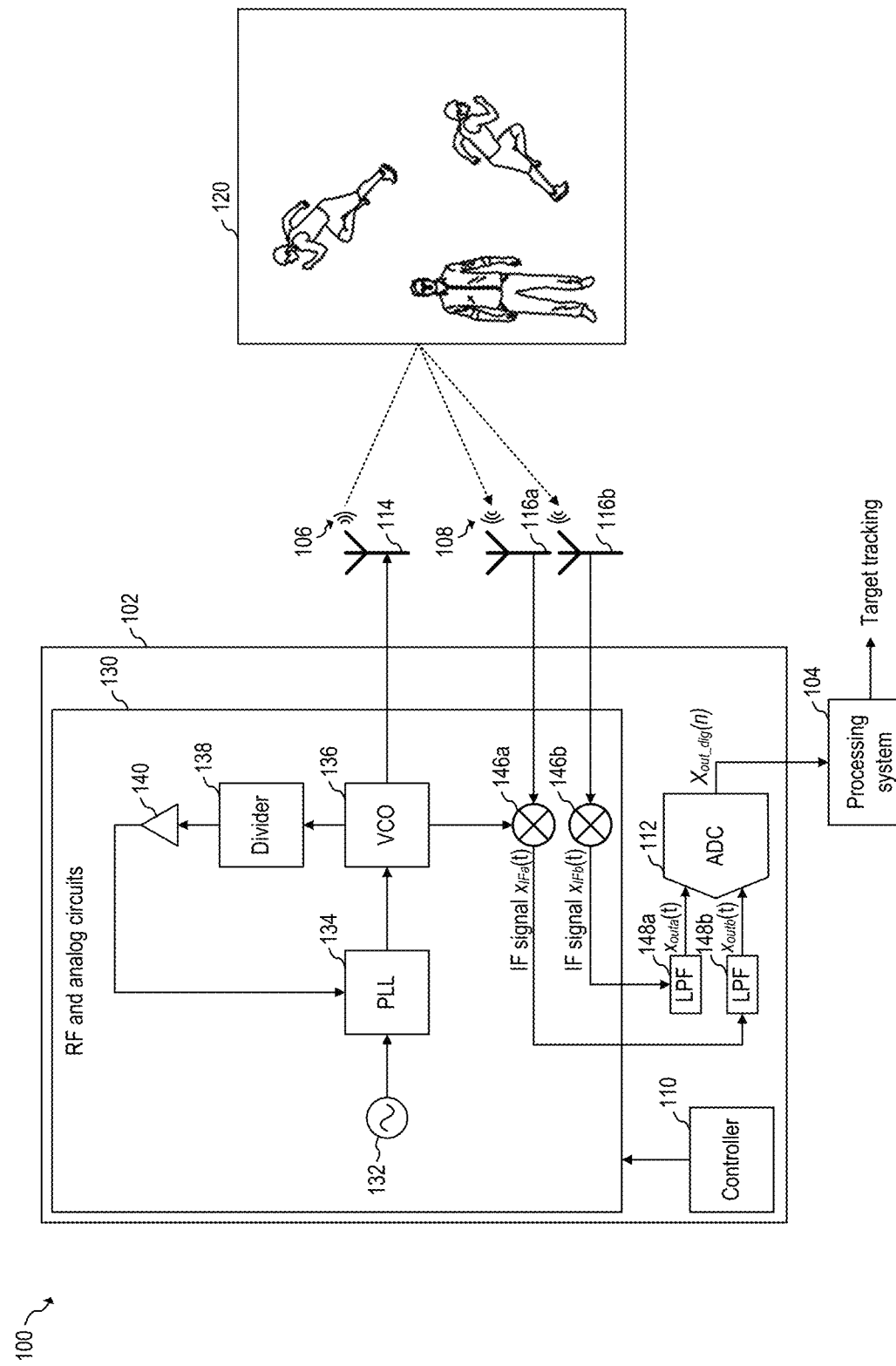
FIG. 1 shows a schematic diagram of a millimeter-wave radar system, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a millimeter-wave radar-based tracker for people sensing. Embodiments of the present invention may be used for tracking other targets (e.g., animals, vehicles, robots, etc.) and/or may operate in regimes different than millimeter-wave.

In an embodiment of the present invention, a millimeter-wave radar is used to track human targets based on features extracted from the detected targets. In some embodiments, some or all of the extracted features used to associate a target to a track are not based on a motion model. Thus, some embodiments are advantageously capable of detecting human targets without knowledge (or with little knowledge) of the motion and/or localization (actual or predicted) of the human targets. Therefore, some embodiments are advantageously capable of tracking human targets using low frame-rates. In some embodiments, using low frame-rates advantageously allows for power savings, which may extend battery life in battery powered applications, and/or may advantageously allow for compliance with regulatory requirements (such as FCC requirements) associated with maximum duty cycle (maximum frame rate) for the radar operation, without sacrificing tracking performance.

In some embodiments, features, such as range, Doppler, and/or angle, are additionally tracked and are also used for associating detected targets to tracks based on a motion model, which may advantageously increase the tracking performance. For example, the range and Doppler velocity at a previous time step may be used to predict the location of the target at a future time step, and such information may be used to increase the confidence that a target assignment is correct (e.g., by using a gating region of expected locations for the target at the future time step).

A radar, such as a millimeter-wave radar, may be used to detect and track humans. For example, FIG. 1 shows a schematic diagram of millimeter-wave radar system 100, according to an embodiment of the present invention. Millimeter-wave radar system 100 includes millimeter-wave radar sensor 102 and processing system 104.

During normal operation, millimeter-wave radar sensor 102 operates as a frequency-modulated continuous-wave (FMCW) radar sensor and transmits a plurality of TX radar signals 106, such as chirps, towards scene 120 using transmitter (TX) antenna 114. The radar signals 106 are generated using RF and analog circuits 130. The radar signals 106 may be in the 20 GHz to 122 GHz range. The objects in scene 120 may include one or more humans, which may be moving or idle, for example. Other objects may also be present in scene 120, other moving or static objects, such as furniture, machinery, mechanical structures, walls, etc.

The radar signals 106 are reflected by objects in scene 120. The reflected radar signals 108, which are also referred to as the echo signal, are received by receiver (RX) antennas 116a and 116b. RF and analog circuits 130 processes the received reflected radar signals 108 using, e.g., band-pass filters (BPFs), low-pass filters (LPFs), mixers, low-noise amplifier (LNA), and/or intermediate frequency (IF) amplifiers in ways known in the art to generate an analog signal $x_{outa}(t)$ and $x_{outb}(t)$.

The analog signal $x_{outa}(t)$ and $x_{outb}(t)$ are converted to raw digital data $x_{out\_dig}(n)$ using ADC 112. The raw digital data $x_{out\_dig}(n)$ is processed by processing system 104 to detect humans and their positions, and to track the detected humans.

Although FIG. 1 illustrates a radar system with a two receiver antennas 116, it is understood that more than two receiver antennas 116, such as three or more, may also be used.

Although FIG. 1 illustrates a radar system with a single transmitter antenna 114, it is understood that more than one transmitter antenna 114, such as two or more, may also be used.

Controller 110 controls one or more circuits of millimeter-wave radar sensor 102, such as RF and analog circuit 130 and/or ADC 112. Controller 110 may be implemented, e.g., as a custom digital or mixed signal circuit, for example. Controller no may also be implemented in other ways, such as using a general purpose processor or controller, for example. In some embodiments, processing system 104 implements a portion or all of controller 110.

Processing system 104 may be implemented with a general purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general purpose microcontroller. Other implementations are also possible.

In some embodiments, millimeter-wave radar sensor 102 and a portion or all of processing system 104 may be implemented inside the same integrated circuit (IC). For example, in some embodiments, millimeter-wave radar sensor 102 and a portion or all of processing system 104 may be implemented in respective semiconductor substrates that are integrated in the same package. In other embodiments, millimeter-wave radar sensor 102 and a portion or all of processing system 104 may be implemented in the same monolithic semiconductor substrate. Other implementations are also possible.

As a non-limiting example, RF and analog circuits 130 may be implemented, e.g., as shown in FIG. 1. During normal operation, VCO 136 generates a radar signal, such as a linear frequency chirp (e.g., from 57 GHz to 64 GHz, or from 76 GHz to 77 GHz), which is transmitted by transmitting antenna 114. The VCO 136 is controlled by PLL 134, which receives a reference clock signal (e.g., 80 MHz) from reference oscillator 132. PLL 134 is controlled by a loop that includes frequency divider 138 and amplifier 140.

The TX radar signal 106 transmitted by transmitting antenna 114 is reflected by objects in scene 120 and received by receiving antennas 116a and 116b. The echo received by receiving antennas 116a and 116b are mixed with a replica of the signal transmitted by transmitting antenna 114 using mixer 146a and 146b, respectively, to produce respective intermediate frequency (IF) signals $x_{IFa}(t)$ $x_{IFb}(t)$ (also known as beat signals). In some embodiments, the beat signals $x_{IFa}(t)$ $x_{IFb}(t)$ have a bandwidth between 10 kHz and 1 MHz. Beat signals with a bandwidth lower than 10 kHz or higher than 1 MHz is also possible.

Beat signals $x_{IFa}(t)$ $x_{IFb}(t)$ are filtered with respective low-pass filters (LPFs) 148a and 148b and then sampled by ADC 112. ADC 112 is advantageously capable of sampling the filtered beat signals $x_{outa}(t)$ $x_{outb}(t)$ with a sampling frequency that is much smaller than the frequency of the signal received by receiving antennas 116a and 116b. Using FMCW radars, therefore, advantageously allows for a compact and low cost implementation of ADC 112, in some embodiments.

The raw digital data $x_{out\_dig}(n)$, which in some embodiments include the digitized version of the filtered beat signals $x_{outa}(t)$ and $x_{outb}(t)$, is (e.g., temporarily) stored, e.g., in matrices of $N_c \times N_s$ per receiver antenna 116, where $N_c$ is the number of chirps considered in a frame and $N_s$ is the number of transmit samples per chirp, for further processing by processing system 104.

In some embodiments, ADC 112 is a 12-bit ADC with multiple inputs. ADCs with higher resolution, such as 14-bits or higher, or with lower resolution, such as 10-bits, or lower, may also be used. In some embodiments, an ADC per receiver antenna may be used. Other implementations are also possible.

Figure 2:
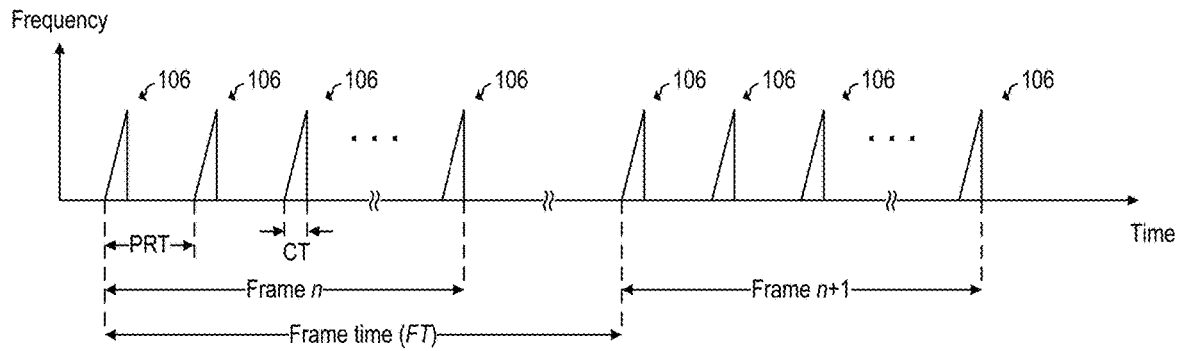
FIG. 2 shows a sequence of chirps transmitted by the transmitter antenna of FIG. 1, according to an embodiment of the present invention.

FIG. 2 shows a sequence of chirps 106 transmitted by TX antenna 114, according to an embodiment of the present invention. As shown by FIG. 2, chirps 106 are organized in a plurality of frames and may be implemented as up-chirps. Some embodiments may use down-chirps or a combination of up-chirps and down-chirps, such as up-down chirps and down-up chirps. Other waveform shapes may also be used.

As shown in FIG. 2, each frame may include a plurality of chirps 106 (also referred to, generally, as pulses). For example, in some embodiments, the number of pulses in a frame is 16. Some embodiments may include more than 16 pulses per frame, such as 20 pulses, 32 pulses, or more, or less than 16 pulses per frame, such as 10 pulses, 8 pulses, 4 or less. In some embodiments, each frame includes only a single pulse.

Frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

The duration of the chirp (from start to finish) is generally referred to as chirp time (CT). In some embodiments, the chirp time may be, e.g., 64 μs. Higher chirp times, such as 128 μs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 102 may be, e.g., 1 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 128 samples, or higher, or a lower number of samples, such as 32 samples or lower, may also be used.

Figure 3:
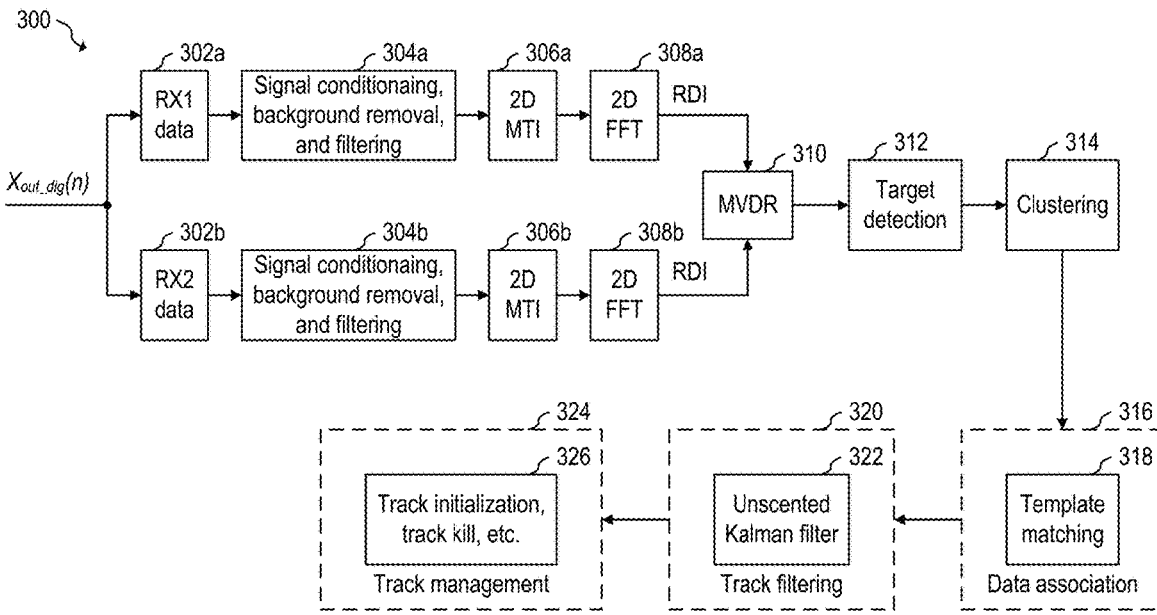
FIG. 3 shows a flow chart of an embodiment method for people tracking, according to an embodiment of the present invention.

FIG. 3 shows a flow chart of embodiment method 300 for people tracking, according to an embodiment of the present invention. Method 300 may be implemented by processing system 104.

During steps 302a and 302b, raw ADC data $x_{out\_dig}(n)$ is received, e.g., from millimeter-wave radar sensor 102. As shown, the raw ADC data $x_{out\_dig}(n)$ includes separate baseband radar data from multiple antennas (e.g., 2 in the example shown in FIG. 3).

During steps 304a and 304b, signal conditioning, low pass filtering and background removal are performed on the raw ADC data of the respective antenna 116. The raw ADC data $x_{out\_dig}(n)$ radar data are filtered, DC components are removed to, e.g., remove the Tx-Rx self-interference and optionally pre-filtering the interference colored noise. Filtering may include removing data outliers that have significantly different values from other neighboring range-gate measurements. Thus, this filtering also serves to remove background noise from the radar data.

During steps 306a and 306b, 2D moving target indication (MTI) filters are respectively applied to data produced during steps 304a and 304b to remove the response from static targets. The MTI filter may be performed by subtracting the mean along the fast-time (intra-chirp time) to remove the transmitter-receiver leakage that perturbs the first few range bins, followed by subtracting the mean along the slow-time (inter-chirp time) to remove the reflections from static objects (or zero-Doppler targets).

During steps 308a and 308b, a series of FFTs are performed on the filtered radar data produced during steps 306a and 306b, respectively. A first windowed FIT having a length of the chirp is calculated along each waveform for each of a predetermined number of chirps in a frame of data. The FFTs of each waveform of chirps may be referred to as a "range FFT." A second FFT is calculated across each range bin over a number of consecutive periods to extract Doppler information. After performing each 2D FIT during steps 308a and 308b, range-Doppler images are produced, respectively.

During step 310, a minimum variance distortionless response (MVDR) technique, also known as Capon, is used to determine angle of arrival based on the range and Doppler data from the different antennas. A range-angle image (RAI) is generated during step 310. In some embodiments, a range-Doppler-angle data cube is generated during step 310.

During step 312, an ordered statistics (OS) Constant False Alarm Rate (OS-CFAR) detector is used to detect targets. The CFAR detector generates a detection image in which, e.g., "ones" represent targets and "zeros" represent non-targets based, e.g., on the power levels of the RAI, by comparing the power levels of the RAI with a threshold, points above the threshold being labeled as targets ("ones") while points below the threshold are labeled as non-targets ("zeros").

In some embodiments, targets present in the detection image generated during step 312 are clustered during step 314, e.g., based on similar feature characteristics, such as empirical mode decomposition (EMD), and/or scale invariant feature transform (SIFT), associated with the detected targets. In some embodiments, other types of features of the detected targets, such as motion model-based features based on, e.g., range, Doppler, and/or angle, may also be used to cluster cells together. In some embodiments, metrics such as correlation and/or Wasserstein distance may be used to determine the similarities between clusters. In some embodiments, the feature-based clustering is performed by using k-means clustering, in which targets are grouped (clustered) based on having similar features to the one of k clusters having the nearest mean of such (e.g., combined) features.

For example, in some embodiments, a vector of features includes a plurality of features (e.g., intrinsic mode functions (IMFs) and/or number of IMFs, which are associated with EMD, and/or magnitude $M(m,n)$ and/or phase $\phi(m,n)$, which are associated with SIFT), where each channel describes a type of feature (e.g., IMFs, number of IMFs, magnitude $M(m,n)$ and/or phase $\phi(m,n)$). Each channel may be described as a Gaussian distribution (taking mean and variance over available vectors of the same feature). A weighted sum over all the different Gaussian distributions over the channels is obtained to provide a descriptor for each cell, where the descriptor is associated with all the feature types and which may be a value or vector that is indicative of the characteristics (features) of the associated cluster and which may be used to determine how similar are clusters. Such descriptor is used for clustering, e.g., using the k-means clustering algorithm.

In some embodiment, a density-based spatial clustering of applications with noise (DBSCAN) algorithm may also be used to associate targets to clusters during step 314. The output of DBSCAN is a grouping of the detected points into particular targets. DBSCAN is a popular unsupervised algorithm, which uses minimum points and minimum distance criteria to cluster targets, and may be implemented in any way known in the art. Other clustering algorithms may also be used.

In some embodiments, thus, clustering results in the radar image (e.g., RAI or RDI) or data cube being divided into groups of cells with similar descriptors. In some embodiments, each cluster corresponds to a (e.g., potential) detected target. Since the spread of features is not necessarily uniform, in some embodiments, each cluster is not necessarily equal. Thus, in some embodiments, the radar image or data cube is divided into clusters of cells, but each cluster of cells is not necessarily of the same size (e.g., does not have the same number of cells/sub-cells).

During step 316, detected (clustered) targets are associated with respective tracks. As will be described in more detail later, in some embodiments, detected targets are associated to respective tracks using feature-based template matching (during step 318). For example, in some embodiments, geometric features are used during step 318 for template matching. A geometric feature may be understood as a feature that is recognizable despite changes in rotation of the target, as well as changes in the range, Doppler velocity, and angle of the centroid of the target. In some embodiments a geometric feature may include a physical geometric feature, such as physical edges of the target (e.g., from the radar image). In some embodiments, additionally or alternatively, a geometric feature may include a metric (e.g., a vector, function, or group of functions) based on the relationship between cells of the raw data (e.g., of the data cube), such as the relationship between range cells, Doppler velocity cells, and/or angle cells. Examples of such metric include functions extracted using functional decomposition of the data cube, gradients of the data cube, and/or statistical properties of the data cube (such as histograms/PDF of the data cube). Examples of geometric features include EMD features and SIFT features.

In some embodiments, geometric features allow for identification of a target without relying on a motion model. In some embodiments, geometric features allow for distinguishing between tracked targets.

In some embodiments, geometric features such as EMD, and/or SIFT, are tracked for each target. For each clustered cell (for each detected target) a feature vector is generated for each time step i with values of each feature associated with the clustered cell. Detected targets at time step i+1 are assigned to respective tracks based on the similarities between feature vectors (e.g., based on the error between the feature vectors), e.g., using Hungarian assignment. For example, in some embodiments, a similarity measure is identified between feature clusters at consecutive time steps (e.g., i, and i+1), and the assignments that minimize the error (e.g., increase correlation) between feature clusters is selected for track assignment.

In some embodiments, the data association step (316) may include, additionally, data association methods that do not rely on featured-based template matching.

In some embodiments, the data assignment of detected targets (clusters) to tracks relies on the geometric features of the cluster and does not rely (or does not rely solely) on the actual physical locations and/or velocities of the detected targets.

During step 320, track filtering is performed, e.g., for tracking a target over time. For example, in some embodiments, the unscented Kalman filter is used to perform track filtering during step 320. For example, in some embodiments, the features (e.g., SIFT, EMD, range, Doppler, angle, deep learning-based parameters, and/or other parameters associated with the track) are, e.g., additional features used to perform data association (which may also be tracked by the Kalman filter). The unscented Kalman filter may also track localization of each track and may rely on the track history of such localization to enhance data association. The Kalman filter may be implemented in any way known in the art.

It is understood that although targets may be identified using template matching (during step 316) that may not include spatial and/or movement information (e.g., range, Doppler, angle), such localization information may still be tracked during step 320. Thus, in some embodiments, featured-based template matching (step 318) is an enabler for data association in environments, such as low frame rate, and/or multi-target scenarios, and/or distributed radar implementations in which relying in localization information alone may be difficult.

During step 324, track management tasks, such as generating tracks and killing tracks are performed. For example, during step 324, track initializations, re-initialization, and/or tracks killing may be performed, e.g., based on whether detected targets are no longer in the field-of-view (in scene 120), or re-entered the field of view, for example.

In some embodiments, steps 316, 320, and 324 may be implemented in different order. For example, in some embodiments, track initialization (during step 324) may be performed before performing step 316.

Figure 4:
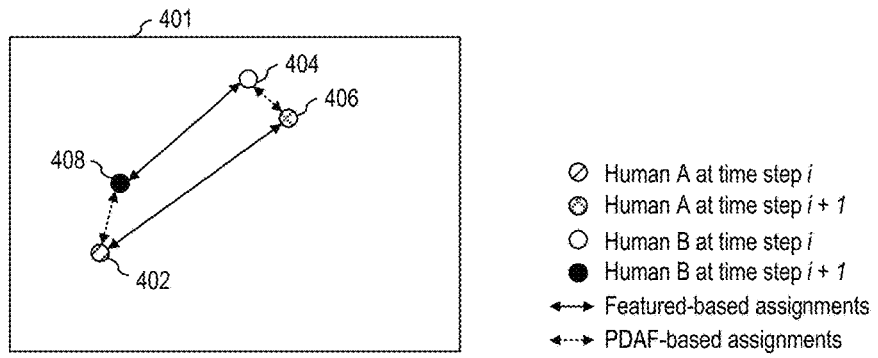
FIG. 4 illustrates target association using template matching, according to an embodiment of the present invention.

FIG. 4 illustrates target association using template matching, according to an embodiment of the present invention. Template matching, e.g., as illustrated in FIG. 4, may be performed, e.g., during step 316.

As shown in FIG. 4, humans A and B move within field-of-view 401 as time progresses (from time step i to time step i+1). In some embodiments the time between time steps i and i+1 may be, e.g., 66 ms (for a 15 frame per second radar system). In some embodiments, faster frame rates may be used. As will be described in more details later, in some embodiments, slower frame rates, such as 10 frames per second radar systems (where the time between time steps i and i+1 is, e.g., 100 ms) or slower, may advantageously be used while preserving the ability to effectively track targets.

As shown in FIG. 4, humans A and B are located at time step i in locations 402 and 404, respectively. At time step i+1, humans A and B are located in locations 406 and 408, respectively. Since at time step i+1 the detected target at location 408 is closer to location 402, and the detected target at location 406 is closer to location 404, a conventional association method using probabilistic data association filter (PDAF) would likely associate detected human B (at location 408) to the track of human A and detected human A (at location 406) to the track of human B. As shown in FIG. 4, using featured-based assignment advantageously allows for correct track assignment without increasing the duty cycle (without reducing the size of time step i so that targets are detected closer in time) by relying on features that are not based (or not based solely) on a motion model. Instead, in some embodiments, detected targets are assigned to track based on the level of correlation between features at, e.g., consecutive time steps. Thus, some embodiments advantageously allow for tracking humans at low duty cycles, such as 10 frames per second or slower.

Figure 5:
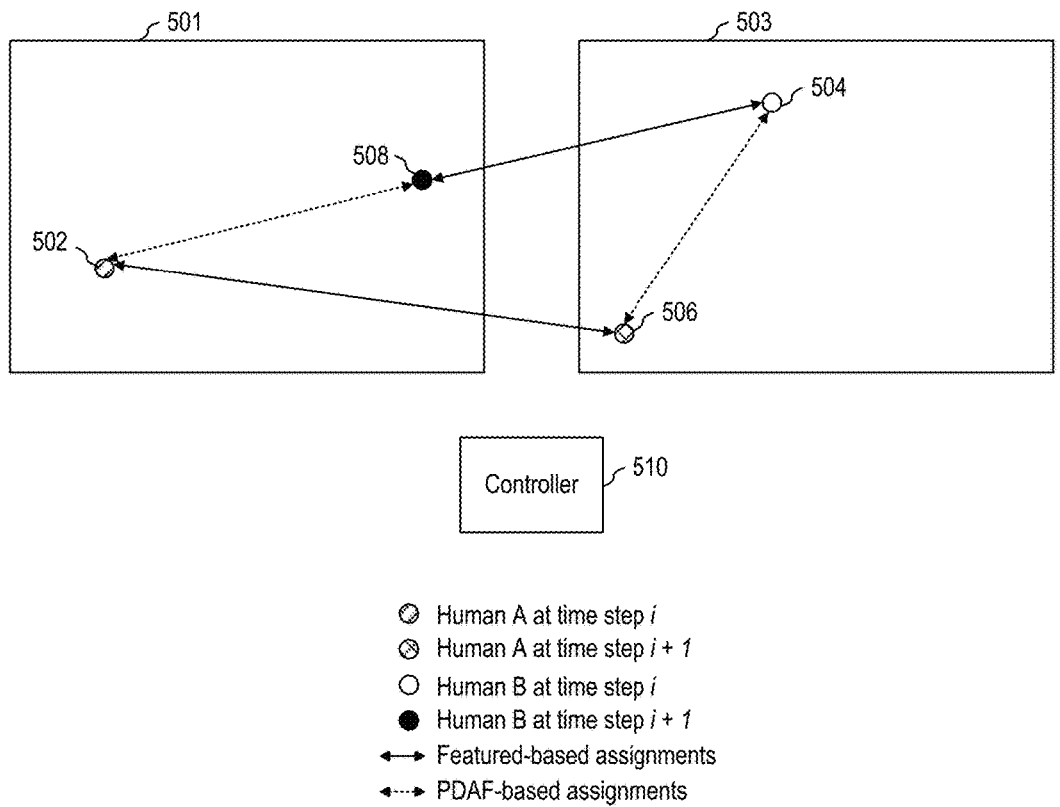
FIG. 5 illustrates target association using template matching using a distributed radar system, according to an embodiment of the present invention.

Since some embodiments rely on geometric features that are not based on a motion model (such as such as EMD, and SIFT) to track targets, some embodiments are advantageously suitable for tracking targets using distributed radar, where a human may move from fields-of-view of different radars and where the radars may lack information about movement of a target outside their own filed-of-view. For example, FIG. 5 illustrates target association using template matching using distributed radar system 500 using 2 radars systems, according to an embodiment of the present invention. In some embodiments, each radar system used in distributed radar system 500 is implemented as millimeter-wave radar system 100. Template matching, e.g., as illustrated in FIG. 4 (and as explained in more detailed later), may be performed, e.g., during step 316 of each radar of distributed radar system 500. In some embodiments, distributed radar system 500 may include more than 2 radars, such as 3, 5, 8 or more.

As shown in FIG. 5, humans A and B move between fields-of-view 501 and 503 as time progresses (from time step i to time step i+1). For example, humans A and B are located at time step i in locations 502 and 504, respectively. At time step i+1, humans A and B are located in locations 506 and 508, respectively. Since the radar with field-of-view 501 detects a single target (Human A at location 502) at time step i and a single target (Human B at location 508) at time i+1, and since the radar with field-of-view 503 detects a single target (Human B at location 504) at time step i and a single target (Human A at location 506) at time i+1, a conventional association method using PDAF would likely associate detected human B (at location 508) to the track of human A and detected human A (at location 506) to the track of human B. As shown in FIG. 5, using featured-based assignment advantageously allows for correct track assignment when a target moves between fields-of view of different radars in a distributed radar system. In some embodiments, a controller 510 shared between radars of distributed radar system 500 is used to identify features of tracked targets, and the common controller 510 may be used to perform the tracking functions. For example, in some embodiments, common controller 510 may perform steps 316, 320 and 324, while processing system 104 of each radar 100 of the distributed radar system 500 performs steps 302, 304, 306, 308, 310, 312, and 314.

In some embodiments, controller 510 may be implemented as part of processing system 104 of one of the radars 100 of distributed radar system 500. In some embodiments, controller 510 may be implemented externally to processing systems 104 of radar systems 100 of distributed radar system 500, e.g., with a general purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general purpose microcontroller. Other implementations are also possible.

For example, in some embodiments, the features of the detected target along with spatial and movement parameters are passed to a central processor 510 (external to each radar of distributed radar system 500) for data association and tracking. In some embodiments, one of the processing systems 104 of the distributed radar system 500 may operate as the central processor 510, e.g., for data association and tracking.

Figure 6:
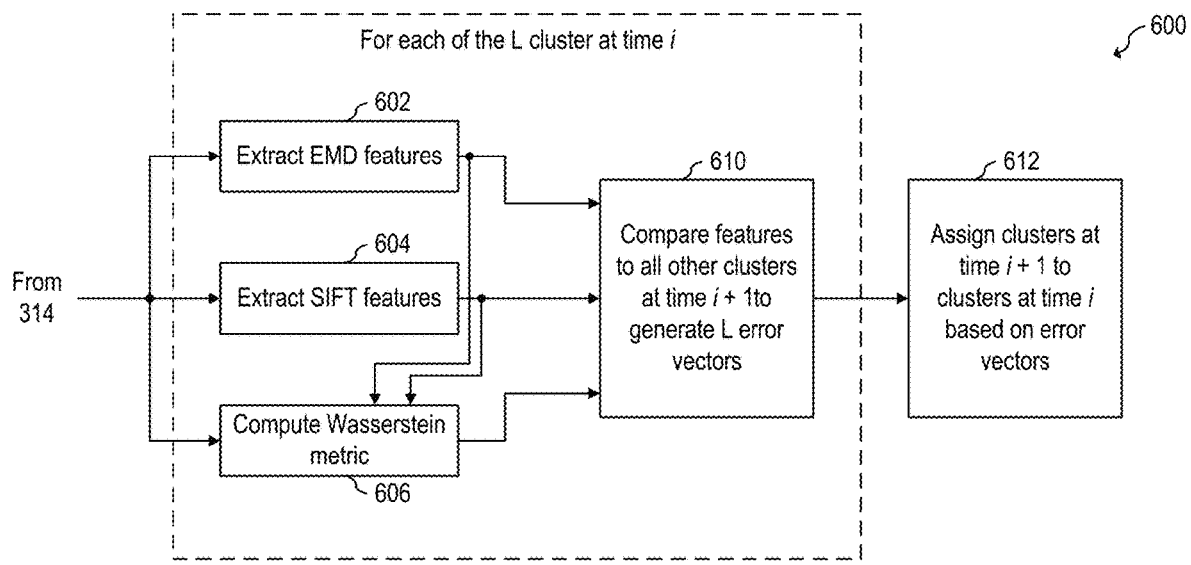
FIG. 6 shows a flow chart of an embodiment method for performing data association using template matching, according to an embodiment of the present invention.

FIG. 6 shows a flow chart of embodiment method 600 for performing data association using template matching, according to an embodiment of the present invention. Step 316 may be performed as method 600.

As shown in FIG. 6, for each of the L clusters (e.g., identified during step 314), features associated with time step i are extracted during steps 602 and 604, and are compared with features of the, e.g., L clusters at time step i+1 during steps 606 and 610 to generate L error vectors. In some embodiments, step 606 may be considered part of step 610 (e.g., such as a way to implement step 610).

During step 612, assignments between L clusters at time step i and L clusters at time step i+1 are made, e.g., to minimize the error between error vectors (e.g., so that the summation of the errors of the error vectors between assigned clusters is minimized). In some embodiments, Hungarian assignment is used during step 612 to associate clusters at time step i to clusters at time step i+1. In some embodiments, each cluster at time step i+1 is associated to the tracks that corresponds to the associated cluster at time i.

In some embodiments, applying Hungarian assignment comprises:

calculating the cost matrix C, where $c_{i,j}$ is the cost between the clusters $p_i$ at time step i and clusters $y_i$ at time step i+1 according to a metric F (e.g., correlation, difference, Wasserstein distance, Euclidean distance, means square error, etc.), and may be given by $$c_{i,j} = F(p_i, y_j) \tag{1}$$

finding the assignment matrix A that minimizes the element-wise product between C and A, e.g., by $$A = \arg_A \min \sum_i^N \sum_j^N c_{ij} a_{ij} \tag{2}$$

reordering the vector y according to the ones in the assignment matrix A, and, e.g., sequentially assigning clusters from vector p to clusters from the ordered vector y.

In some embodiments, the number of clusters at time steps i and i+1 are different (e.g., since a previously detected target disappears, or a new target arrives to the field-of view). In some such embodiments, assignment is made to minimize the error between vectors at each time step, and the error of the additional vectors that are not associated with a corresponding vector at the other time step are assigned a default error. In some embodiments, for each unassigned cluster or target, and error counter is used to count how many times there are unsigned targets, and corresponding tracks are killed when the counter reaches a predetermined threshold (e.g., 5, 6, etc.).

In some embodiments, a motion model that relies on features such as range, Doppler, and/or angle, is also used for associating detected targets to tracks, which may advantageously increase the tracking performance. For example, the range and Doppler velocity at a previous time step may be used to predict the location of the target at a future time step, and such information may be used to increase the confidence that a target assignment is correct (e.g., by using a gating region of expected locations for the target at the future time step), and where the confidence level is used to associate the target to a track. Thus, in some embodiments, associating a target to a track is further based on a motion-based model, e.g., based on range, Doppler, and/or angle.

Figure 7:
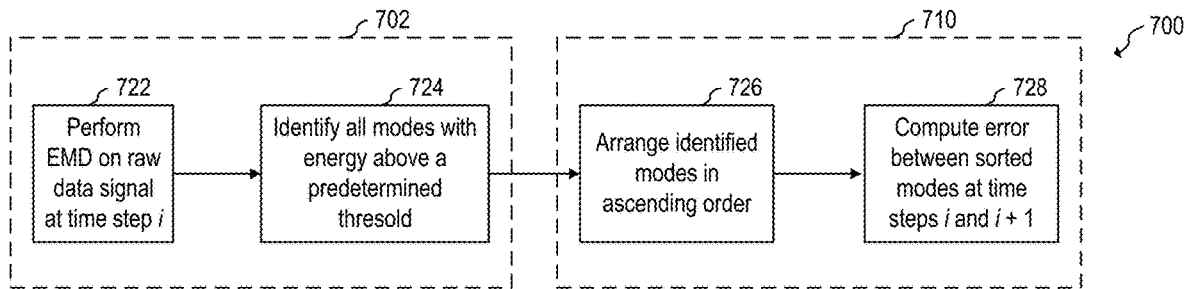
FIG. 7 shows a flow chart of an embodiment method for extracting empirical mode decomposition (EMD) features and computing the error associated with the extracted EMD features, according to an embodiment of the present invention.

FIG. 7 shows a flow chart of embodiment method 700 for extracting EMD features (step 702) and computing the error associated with the extracted EMD features (step 710), according to an embodiment of the present invention. In some embodiments, step 602 may be performed as step 702, and the portion of steps 610 associated with comparing EMD features may be performed as step 710.

During step 702, EMD feature extraction is performed. EMD may be understood as a way to decompose a signal data into intrinsic mode functions (IMF) of instantaneous frequencies contained in the original signal data. The disintegrated signal components form a complete or nearly orthogonal basis of the original data signal. In some embodiments, EMD is performed on raw data (e.g., the Doppler signal) associated with the cluster cell. For example, in some embodiments, EMD is performed on raw data (e.g., from the data cube) associated with a particular cluster cell at time step i.

During step 724, the IMFs having an energy higher than a predetermined value are identified. During step 726, the identified IMFs are sorted (e.g., in ascending order). During step 728, the error between the sorted identified IMFs at time i (for each cluster cell) and the sorted IMFs of each cluster at time i+1 is computed to generate, e.g., L, error values for each cluster cell at time i (which may be used as part of the error vectors in step 610).

In some embodiments, the error between IMFs at time steps i and i+1 is determined by using, e.g., means square error. In some embodiments, the number of IMF above the threshold may also be used to determine the error between clusters at time steps i and i+1.

In some embodiments, the EMD features (e.g., the sorted IMFs) between all clusters at time step i and all clusters at time step i+1, are compared, and the cluster pairs at time steps i and i+1 resulting in the lowest means square error are associated.

Figure 8:
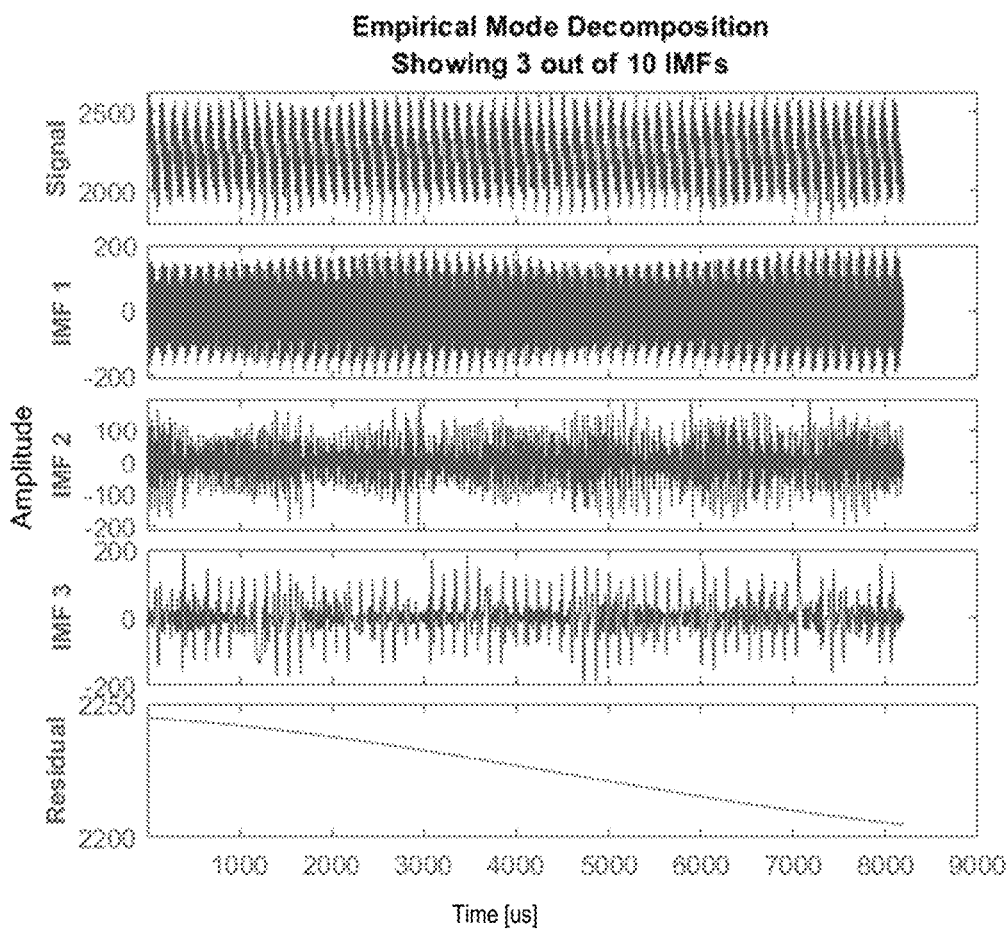
FIG. 8 shows waveforms of a disintegration of a data signal into multiple intrinsic frequency components through EMD, according to an embodiment of the present invention.

FIG. 8 shows waveforms of a disintegration of a data signal into multiple intrinsic frequency components through EMD, according to an embodiment of the present invention.

In the embodiment of FIG. 8, three dominant modes (IMF1, IMF2, and IMF3) out of ten modes have an energy higher than the predetermined threshold.

Figure 9:
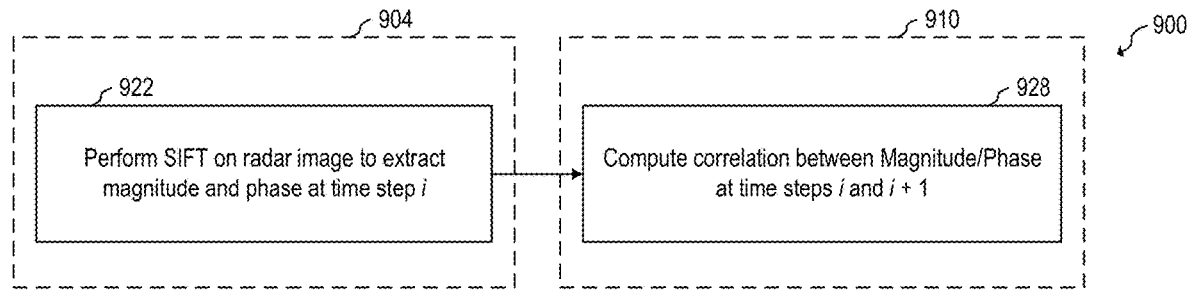
FIG. 9 shows a flow chart of an embodiment method for extracting invariant feature transform (SIFT) features and computing the error associated with the extracted SIFT features, according to an embodiment of the present invention.

FIG. 9 shows a flow chart of embodiment method 900 for extracting SIFT features (step 904) and computing the error associated with the extracted SIFT features (step 910), according to an embodiment of the present invention. In some embodiments, step 604 may be performed as step 904, and the portion of step 610 associated with comparing SIFT features may be performed as step 910.

During step 922, SIFT feature extraction is performed. SIFT may be understood as a pattern recognition method for detecting features of a radar image (e.g., RDI, RAI) that are, e.g., invariant to scaling, rotation, translation, and geometrical distortion, or any affine distortion of the image. For example, in some embodiments, SIFT feature extraction is obtained by computing gradients between the different cells of an image. For example, for each clustered cell, magnitude M(m,n) and phase ϕ(m,n) may be determined by applying Equations 3 and 4:

$$M(m, n) = \sqrt{((X(m+1, n) - X(m-1, n)))^2 + ((X(m, n+1) - X(m, n-1)))^2} \tag{3}$$

$$\phi(m, n) = \mathrm{atan}\left(\frac{((X(m, n+1) - X(m, n-1)))}{((X(m+1, n) - X(m-1, n)))}\right) \tag{4}$$

where X(m,n) are the sub-cells of the clustered cell of the radar image, m,n being the location of the sub-cell.

In some embodiments, SIFT feature extraction is performed on, e.g., RDI, RAI, or data cube (e.g., from steps 308*a*, 308*b*, and/or 310) on a region associated with a particular cluster cell at time step i, by, e.g., using Equations 3 and 4.

During step 928, the error between the magnitude and/or phase of the cluster cell at time i and of each of the other clusters at time i+1 is computed to generate L error values (which may be used as part of the error vectors in step 610).

For example, in some embodiments, a correlation value r may be used, which may be given by $$r = \frac{\sum (x-\bar{x})(y-\bar{y})}{\sqrt{\sum (x-\bar{x})^2(y-\bar{y})^2}} \quad (5)$$

where x is the magnitude M or phase ϕ vector at time i, $\bar{x}$ is the mean of the magnitude M or phase ϕ vectors at time i, y is the magnitude M or phase ϕ at time i+1, and $\bar{y}$ is the mean of the magnitude M or phase ϕ vectors at time i+1. In embodiments in which both magnitude M or phase ϕ are used, Equation 5 is applied respectively to each metric (magnitude M and phase ϕ) and an (e.g., weighted) average between the two correlations r obtained with Equation 5 is used as a single metric associated with the SIFT feature of the clustered cell.

In some embodiments, the correlation r between SIFT features is computed between all clusters at time step i and all clusters at time step i+1, e.g., by using Equation 5. In some embodiments, the clusters at time steps i and i+1 having the highest correlation and greater than a predetermined correlation threshold are associated. In some embodiments, the predetermined correlation threshold is between 0.5 and 0.9.

Figure 10A:
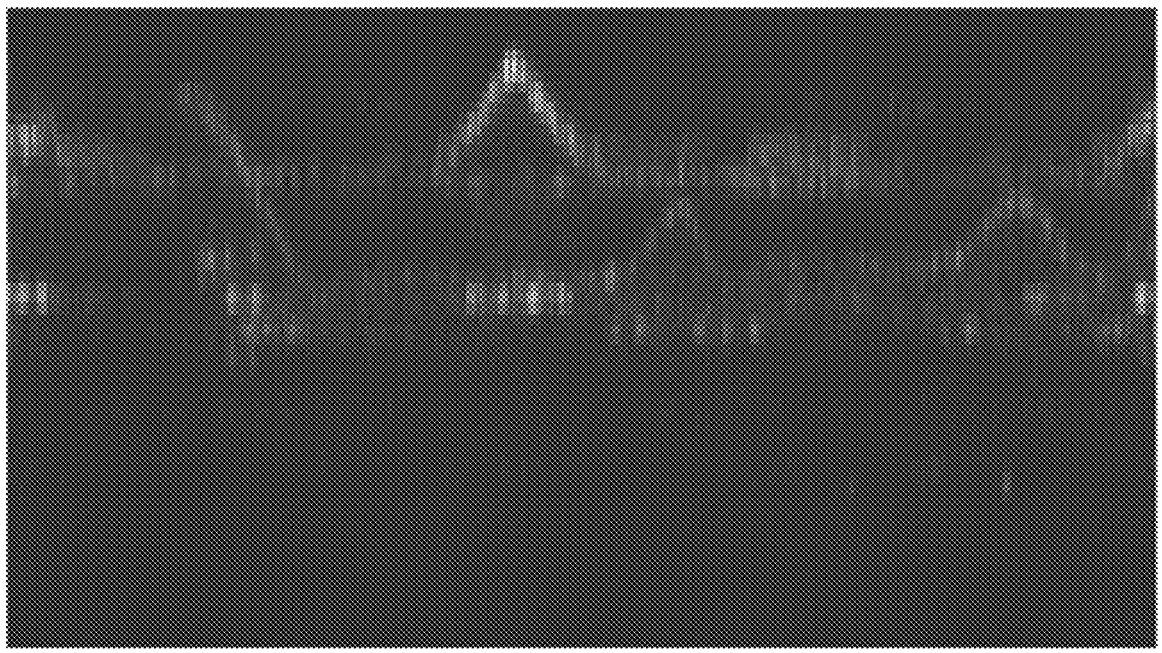
FIGS. 10A and 10B show an input radar image and corresponding histogram of gradients with SIFT features, respectively, according to an embodiment of the present invention.
Figure 10B:

FIGS. 10A and 10B show an input radar image and corresponding histogram of gradients with SIFT features, respectively, according to an embodiment of the present invention.

Figure 11:
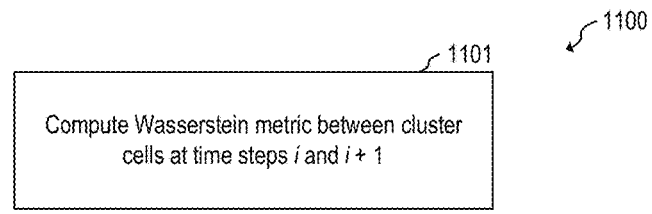
FIG. 11 shows a flow chart of an embodiment method for computing the Wasserstein distance between clusters at consecutive time steps, according to an embodiment of the present invention.

FIG. 11 shows a flow chart of embodiment method 1100 for computing the Wasserstein distance between clusters at time steps i and i+1, according to an embodiment of the present invention. In some embodiments, step 606 may be performed as step 1101.

During step 1101, the Wasserstein distance is computed between clusters at time steps i and i+1. The Wasserstein distance (also referred to as earth mover's distance, Wasserstein metric or Kantorovich-Rubinstein metric) is a mathematical function that computes, in addition to the similarities between two probability distributions, the distance between the two probability distributions. It is understood that the term "distance," as used with respect to the Wasserstein metric, is the distance between distributions and not necessarily a physical distance. For example, the Wasserstein metric may be used to determine the distance between SIFT features of two clusters, and/or between EMD features of two clusters. The Wasserstein metric may be a physical distance in other scenarios, e.g., when used with respect to RAI or RDI data.

In some embodiments, the raw data (e.g., a vector of different feature values, such as SIFT and/or EMD, as well as, e.g., range, Doppler and/or angle) associated with each cluster is modeled (approximated) as a Gaussian distribution having a respective mean μ and standard deviation G. For example, in an embodiment having a cluster (P1) at time step i having mean $\mu_1$ and standard deviation $\sigma_1$, and a cluster (P2) at time step i+1 having mean $\mu_2$ and standard deviation $\sigma_2$, the Wasserstein metric may be computed as $$W_{12} = \sqrt{\|\mu_1 - \mu_2\|_2^2 + \sigma_1 + \sigma_1 - 2\sqrt{\sigma_1\sigma_2}} \quad (6)$$

where $\|\ \|_2^2$ is the L2 norm.

In some embodiments, the Wasserstein metric is computed between all clusters at time step i and all clusters at time step i+1, e.g., by using Equation 6. In some embodiments, the clusters at time steps i and i+1 having the lowest Wasserstein distance are associated.

Figure 12:
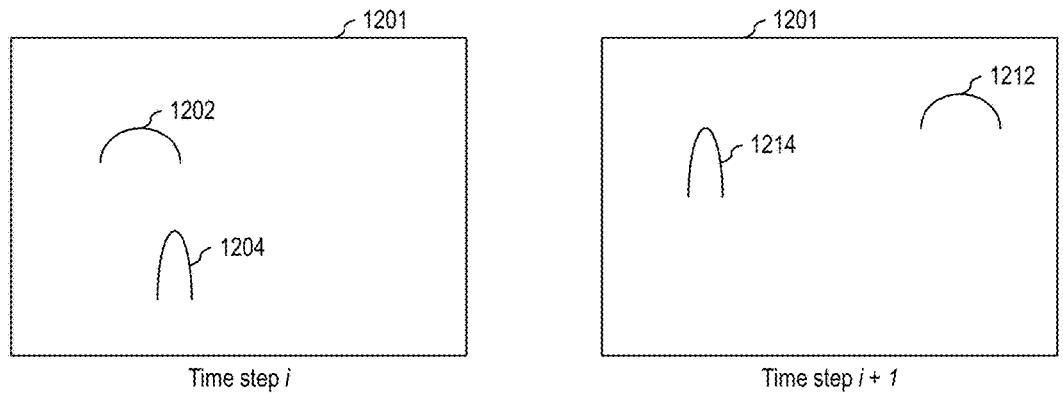
FIG. 12 shows radar images having two clusters at consecutive time steps, according to an embodiment of the present invention.

FIG. 12 shows image 1201 having two clusters at time i and i+1, according to an embodiment of the present invention. Each cluster cell 1202, 1204, 1212, and 1214 is approximated as a Gaussian distribution. In some embodiments, all possible Wasserstein distances between time steps i and i+1 are determined, which in this embodiment is four Wasserstein distances, namely, $W_{1202,1212}$ (between clusters 1202 and 1212), $W_{1202,1214}$ (between clusters 1202 and 1214), $W_{1204,1212}$ (between clusters 1204 and 1212), and $W_{1204,1214}$ (between clusters 1204 and 1214). Each Wasserstein distance ($W_{1202,1212}$, $W_{1202,1214}$, $W_{1204,1212}$, $W_{1204,1214}$) may be computed using Equation 6. In some embodiments, clusters having the lowest Wasserstein distance are associated.

In some embodiments, image 1201 is a representation of features (e.g., SIFT, EMD) and the Wasserstein metric is used to determine the similarities between features. In some embodiments, image 1201 is a radar image (e.g., RAI, RDI), and the Wasserstein metric is used for motion-based tracking (e.g., using Euclidean distance).

In some embodiments, a single type of feature is used during template matching. For example, in some embodiments, step 316 is performed by performing steps 702 and 710, and assigning clusters at time steps i and i+1, e.g., by minimizing the total means square error. In some embodiments, step 316 is performed by performing steps 904 and 910, and assigning clusters at time steps i and i+1, e.g., by maximizing the correlation between clusters. In some embodiments, step 316 is performed by performing step 1101 based solely on EMD features or based solely on SIFT features, and assigning clusters at time steps i and i+1, e.g., by minimizing the Wasserstein distance (e.g., minimizing the summation of the Wasserstein distances between matched clusters).

Figure 13:
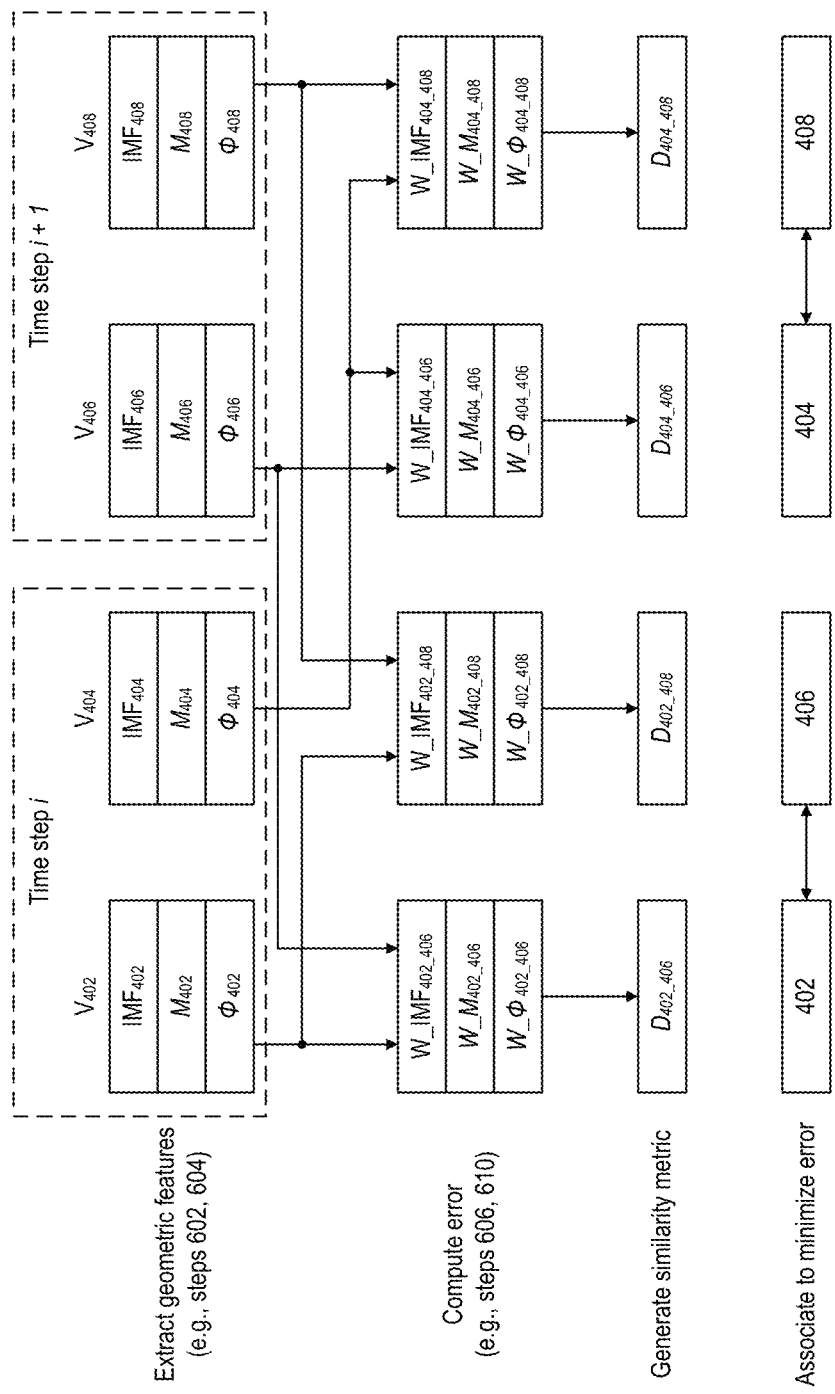
FIG. 13 illustrates a method for performing data association using template matching, as applied to the example of FIG. 4, according to an embodiment of the present invention.

FIG. 13 illustrates a method for performing data association using template matching, as applied to the example of FIG. 4, according to an embodiment of the present invention.

As shown, FIG. 13 illustrates a non-limiting example in which, EMD feature extraction (step 602) and SIFT feature extraction (step 604) are used to extract geometric features for clusters 402 and 404 (at time step i) and clusters 406 and 408 (at time step i+1), and the Wasserstein metric (step 606) is computed between each of the clusters detected at time step i (402 and 404) and each of the clusters detected at time step i+1 (406 and 408) for each of the geometric features extracted.

As shown in FIG. 13, IMFs higher than a predetermined threshold are identified for each cluster identified at time step i (402 and 404) and at time step i+1 (406 and 408). Magnitude M and phase ϕ associated with SIFT features are also extracted for each cluster identified at time step i (402 and 404) and at time step i+1 (406 and 408). Resulting vectors of features $V_{402}$, $V_{404}$, $V_{406}$, and $V_{408}$ associated with clusters 402, 404, 406 and 408, respectively, are generated. The vectors of features $V_{402}$, $V_{404}$, $V_{406}$, and $V_{408}$ are modeled as Gaussian distributions, and the Wasserstein distance is computed between each cluster identified at time step i (402 and 404) and at time step i+1 (406 and 408) for each feature (in this example, IMF, M, and ϕ). Thus, a resulting error vector of error metrics (in this example Wasserstein distances, although other metrics, such as correlation, can also be used) is generated for each possible assignment between clusters identified at time step i and i+1 (in this example, 402/406, 402/408, 404/406, and 404/408).

A similarity metric is then generated, e.g., by using a (e.g., weighted) average of each of the errors (in this example Wasserstein distances) inside each of the error vectors. Thus, the similarity metric may be used as a metric indicating how similar two clusters are. Assignment is then made (e.g., using Hungarian assignment) to minimize the total error. For example, in this example, the sum of errors $D_{402\_406}$ and $D_{404\_408}$ is lower than the sum of the sum of errors $D_{404\_406}$ and $D_{402\_408}$ and thus clusters 402 and 406 are matched and clusters 404 and 408 are matched (as also shown in FIG. 4).

In some embodiments, such as shown in FIG. 6, more than one type of feature may be used to perform template matching. In such embodiments, it is possible that a first type of feature (e.g., EMD) is indicative of a first matching (e.g., matching cluster A at time step i with cluster A' at time step i+1, and matching cluster B at time step i with cluster B' at time step i+1), and a second type of feature (e.g., SIFT) is indicative of a second different matching (e.g., matching cluster A at time step i with cluster B' at time step i+1, and matching cluster B at time step i with cluster A' at time step i+1). In some such embodiments, the average error may be used to determine a final cluster assignment to a particular track. In some embodiments, a weighted average (with, e.g., predetermined coefficients) may be used instead of averaging. In some embodiments, the function F in Equation 1 may be modified to account for, e.g., averaging or applying weighted coefficients to respective error metrics associated with respective features.

As shown in FIG. 6, template matching may be performed with one or more of EMD and SIFT features. Some embodiments may include different features for template matching. For example, some embodiments may rely on deep-learning based feature extraction and association through correlation by using deep convolutional neural networks (DCNN) for processing the data cube (range-Doppler-angle data cube, e.g., from the output of step 310) for extracting geometric features to be used during the template matching step to determine similarities between clusters (e.g., during steps 606 and/or 610) by determining the correlation and/or Wasserstein distance between such deep-learning based geometric features.

For example, in some embodiments, the output of the Lth layer of a DCNN may be given by $(W_l,H_l,D_l)$, where $W_l,H_l$ are the width and height of each feature map and DI is the dimension/number of feature maps at Lth layer. In some embodiments, instead of one layer, multiple layer outputs can be treated as extracted features, for e.g., layer L and layer L+1.

In some embodiments, the DCNN is trained to learn distinct geometric features by using supervised learning with a data set including multiple (e.g., human) targets performing a plurality of activities (e.g., walking, running, standing idle, etc.).

In some embodiments, template matching is performed, in addition to one or more of EMD, SIFT and/or deep learning-based geometric features, on a motion model relying on one or more of range, Doppler, and angle.

Example embodiments of the present invention are summarized here. Other embodiments can also be understood from the entirety of the specification and the claims filed herein.

Example 1. A method for tracking targets, the method including: receiving data from a radar sensor of a radar; processing the received data to detect targets; identifying a first geometric feature of a first detected target at a first time step, the first detected target being associated to a first track; identifying a second geometric feature of a second detected target at a second time step; determining an error value based on the first and second geometric features; and associating the second detected target to the first track based on the error value.

Example 2. The method of example 1, where associating the second detected target to the first track includes associating the second detected target to the first track when the error value is lower than a predetermined threshold.

Example 3. The method of one of examples 1 or 2, where associating the second detected target to the first track includes associating the second detected target to the first track using Hungarian assignment.

Example 4. The method of one of examples 1 to 3, where: identifying the first geometric feature includes: performing a first empirical mode decomposition (EMD) on received data associated with the first detected target, identifying first intrinsic mode functions (IMFs) from the first EMD that are higher than a predetermined threshold, and sorting the first IMFs; identifying the second geometric feature includes: performing second EMD on received data associated with the second detected target, identifying second IMFs from the second EMD that are higher than the predetermined threshold, and sorting the second IMFs; and determining the error value includes determining a mean square error based on the sorted first and second IMFs.

Example 5. The method of one of examples 1 to 4, where identifying the first geometric feature includes performing invariant feature transform (SIFT) feature extraction on a first radar image associated with the first time step based on the received data to extract first magnitude or first phase associated with the first detected target, where identifying the second geometric feature includes performing SIFT feature extraction on a second radar image associated with the second time step based on the received data to extract second magnitude or second phase associated with the second detected target, and where determining the error value includes determining a correlation between the first magnitude and the second magnitude or between the first phase and the second phase.

Example 6. The method of one of examples 1 to 5, where determining the error value includes determining the correlation between the first magnitude and the second magnitude and between the first phase and the second phase.

Example 7. The method of one of examples 1 to 6, where identifying the first geometric feature includes approximating data associated with the first detected target at the first time step to a Gaussian distribution having a first mean and a first standard deviation, where identifying the second geometric feature includes approximating data associated with the second detected target at the second time step to a Gaussian distribution having a second mean and a second standard deviation, and where determining the error value includes determining the error value based on the first mean, the second mean, the first standard deviation, and the second standard deviation.

Example 8. The method of one of examples 1 to 7, further including clustering detected targets into clusters of cells using k-mean clustering to generate a plurality of clusters, where the first and second detected targets are first and second clusters of the plurality of clusters.

Example 9. The method of one of examples 1 to 8, further including tracking the first detected target using an unscented Kalman filter.

Example 10. The method of one of examples 1 to 9, where tracking the first detected target includes tracking localization information of the first detected target over time.

Example 11. The method of one of examples 1 to 10, further including: identifying first range and first Doppler velocity associated with the first detected target at the first time step; and identifying second range and second Doppler velocity associated with the second detected target at the second time step, where associating the second detected target to the first track is further based on the first and second ranges, and on the first and second Doppler velocities.

Example 12. The method of one of examples 1 to 11, where the first and second detected targets are human targets.

Example 13. The method of one of examples 1 to 12, where the first and second time steps are consecutive time steps.

Example 14. The method of one of examples 1 to 13, further including: transmitting radar signals using a transmitter antenna of the radar; receiving reflected radar signals using a receiver antenna of the radar; and generating digital data from the received reflected radar signals using an analog-to-digital converter (ADC), where receiving the data from the radar includes receiving the data from the ADC, and where transmitting the radar signals includes transmitting the radar signals with a frame rate of 10 frames per second or slower.

Example 15. The method of one of examples 1 to 14, where the radar is a millimeter-wave radar.

Example 16. The method of one of examples 1 to 15, further including: receiving further data from a further radar sensor of a further radar; processing the received further data to detect further targets; identifying a further geometric feature of a further detected target at a third time step; determining a further error value based on the first and further geometric features; and associating the further detected target to the first track associated to the first detected target based on the further error value.

Example 17. A radar system including: a millimeter-wave radar sensor including: a transmitting antenna configured to transmit radar signals; first and second receiving antennas configured to receive reflected radar signals; an analog-to-digital converter (ADC) configured to generate, at an output of the ADC, raw digital data based on the reflected radar signals; and a processing system configured to process the raw digital data to: detect targets, identify a first geometric feature of a first detected target at a first time step, identify a second geometric feature of a second detected target at a second time step, determine an error value based on the first and second geometric features, and associate the second detected target to a first track associated to the first detected target based on the error value.

Example 18. The radar system of example 17, where the transmitting antenna is configured to transmit radar signals at a rate of 10 frames per second or slower.

Example 19. A method including: receiving data from a radar sensor of a radar; processing the received data to detect humans; clustering detected humans into clusters of cells using k-mean clustering to generate a plurality of clusters; identifying a first geometric feature of a first cluster of the plurality of clusters at a first time step; identifying a second geometric feature of a second cluster of the plurality of clusters at a second time step, where the first and second time steps are consecutive time steps; determining an error value based on the first and second geometric features; and associating the second cluster to a first track associated to the first cluster based on the error value.

Example 20. The method of example 19, where: identifying the first geometric feature includes: performing a first empirical mode decomposition (EMD) on received data associated with the first cluster, identifying first intrinsic mode functions (IMFs) from the first EMD that are higher than a predetermined threshold, and sorting the first IMFs; identifying the second geometric feature includes: performing second EMD on received data associated with the second cluster, identifying second IMFs from the second EMD that are higher than the predetermined threshold; and determining the error value includes determining the error value based on the first and second IMFs.

Example 21. The method of one of examples 19 or 20, where identifying the first and second geometric features includes using a deep convolutional neural network based on a data cube derived from the received data.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for tracking targets, the method comprising:
receiving reflected radar signals from a radar sensor of a radar;
generating received reflected radar data from the received reflected radar signals;
processing the received reflected radar data to detect targets;
identifying a first geometric feature of a first detected target at a first time step, the first detected target being associated to a first track;
identifying a second geometric feature of a second detected target at a second time step;
determining an error value based on the first and second geometric features; and
associating the second detected target to the first track based on the error value, wherein
identifying the first geometric feature and identifying the second geometric feature comprises performing a first empirical mode decomposition (EMD) on data associated with the first detected target based on the processed received reflected radar data, identifying first intrinsic mode functions (IMF's) from the first EMD that are higher than a first predetermined threshold, and performing a second EMD on data associated with the second detected target based on the processed received reflected radar data, or
identifying the first geometric feature and identifying the second geometric feature comprises performing a first invariant feature transform (SIFT) feature extraction on a first radar image associated with the first time step based on the received reflected radar data to extract first magnitude or first phase associated with the first detected target, and performing a second SIFT feature extraction on a second radar image associated with the second time step based on the received reflected radar data to extract second magnitude or second phase associated with the second detected target.

2. The method of claim 1, wherein associating the second detected target to the first track comprises associating the second detected target to the first track when the error value is lower than a second predetermined threshold.

3. The method of claim 1, wherein associating the second detected target to the first track comprises associating the second detected target to the first track using Hungarian assignment.

4. The method of claim 1, wherein:
identifying the first geometric feature further comprises:
sorting the first IMFs;
identifying the second geometric feature comprises:
identifying second IMFs from the second EMD that are higher than the first predetermined threshold, and sorting the second IMFs; and
determining the error value comprises determining a mean square error based on the sorted first and second IMFs.

5. The method of claim 1, wherein determining the error value comprises determining a correlation between the first magnitude and the second magnitude or between the first phase and the second phase.

6. The method of claim 5, wherein determining the error value comprises determining the correlation between the first magnitude and the second magnitude and between the first phase and the second phase.

7. The method of claim 1, wherein identifying the first geometric feature further comprises approximating the data associated with the first detected target at the first time step to a Gaussian distribution having a first mean and a first standard deviation, wherein identifying the second geometric feature comprises approximating the data associated with the second detected target at the second time step to a Gaussian distribution having a second mean and a second standard deviation, and wherein determining the error value comprises determining the error value based on the first mean, the second mean, the first standard deviation, and the second standard deviation.

8. The method of claim 1, further comprising clustering detected targets into clusters of cells using k-mean clustering to generate a plurality of clusters, wherein the first and second detected targets are first and second clusters of the plurality of clusters.

9. The method of claim 1, further comprising tracking the first detected target using an unscented Kalman filter.

10. The method of claim 9, wherein tracking the first detected target comprises tracking localization information of the first detected target over time.

11. The method of claim 1, further comprising:
identifying first range and first Doppler velocity associated with the first detected target at the first time step; and
identifying second range and second Doppler velocity associated with the second detected target at the second time step, wherein associating the second detected target to the first track is further based on the first and second ranges, and on the first and second Doppler velocities.

12. The method of claim 1, wherein the first and second detected targets are human targets.

13. The method of claim 1, wherein the first and second time steps are consecutive time steps.

14. The method of claim 1, further comprising:
transmitting radar signals using a transmitter antenna of the radar;
receiving the reflected radar signals using a receiver antenna of the radar; and
generating the received reflected radar data from the received reflected radar signals using an analog-to-digital converter (ADC), and wherein transmitting the radar signals comprises transmitting the radar signals with a frame rate of 10 frames per second or slower.

15. The method of claim 1, wherein the radar is a millimeter-wave radar.

16. The method of claim 1, further comprising:
receiving further reflected radar signals from a further radar sensor of a further radar;
processing the received further reflected radar signals to detect further targets;
identifying a further geometric feature of a further detected target at a third time step;
determining a further error value based on the first and further geometric features; and
associating the further detected target to the first track associated to the first detected target based on the further error value.

17. A radar system comprising:
a millimeter-wave radar sensor comprising:
a transmitting antenna configured to transmit radar signals;
first and second receiving antennas configured to receive reflected radar signals;
an analog-to-digital converter (ADC) configured to generate, at an output of the ADC, raw digital data based on the reflected radar signals; and
a processing system configured to process the raw digital data to:
detect targets,
identify a first geometric feature of a first detected target at a first time step,
identify a second geometric feature of a second detected target at a second time step,
determine an error value based on the first and second geometric features, and
associate the second detected target to a first track associated to the first detected target based on the error value, wherein:
the processing system is configured to identify the first geometric feature and identify the second geometric feature by performing a first empirical mode decomposition (EMD) on data associated with the first detected target based on the raw digital data, identifying first intrinsic mode functions (IMF's) from the first EMD that are higher than a predetermined threshold, and performing a second EMD on data associated with the second detected target based on the raw digital data, or
the processing system is configured to identify the first geometric feature and identify the second geometric feature comprises performing a first invariant feature transform (SIFT) feature extraction on a first radar image associated with the first time step based on the raw digital data to extract first magnitude or first phase associated with the first detected target, and performing a second SIFT feature extraction on a second radar image associated with the second time step based on the raw digital data to extract second magnitude or second phase associated with the second detected target.

18. The radar system of claim 17, wherein the transmitting antenna is configured to transmit the radar signals at a rate of 10 frames per second or slower.

19. A method comprising:
receiving reflected radar signals from a radar sensor of a radar;
generating received reflected radar data from the received reflected radar signals;

processing the received reflected radar data to detect humans;

clustering detected humans into clusters of cells using k-mean clustering to generate a plurality of clusters;

identifying a first geometric feature of a first cluster of the plurality of clusters at a first time step;

identifying a second geometric feature of a second cluster of the plurality of clusters at a second time step, wherein the first and second time steps are consecutive time steps;

determining an error value based on the first and second geometric features; and associating the second cluster to a first track associated to the first cluster based on the error value, wherein identifying the first geometric feature and identifying the second geometric feature comprises performing a first empirical mode decomposition (EMD) on data associated with the first cluster based on the processed received reflected radar data, identifying first intrinsic mode functions (IMF's) from the first EMD that are higher than a predetermined threshold, and performing a second EMD on data associated with the second cluster based on the processed received reflected radar data, or identifying the first geometric feature and identifying the second geometric feature comprises performing a first invariant feature transform (SIFT) feature extraction on a first radar image associated with the first time step based on the received reflected radar data to extract first magnitude or first phase associated with the first cluster, and performing a second SIFT feature extraction on a second radar image associated with the second time step based on the received data to extract second magnitude or second phase associated with the second cluster.

20. The method of claim 19, wherein:

identifying the first geometric feature comprises:
sorting the first IMFs;

identifying the second geometric feature comprises:
identifying second IMFs from the second EMD that are higher than the predetermined threshold; and determining the error value comprises determining the error value based on the first and second IMFs.

21. The method of claim 19, wherein identifying the first and second geometric features comprises using a deep convolutional neural network based on a data cube derived from the received data.

* * * * *